US006827166B2

(12) United States Patent
Alber

(10) Patent No.: US 6,827,166 B2
(45) Date of Patent: Dec. 7, 2004

(54) OPERATING-AND BRAKING-ASSISTANCE DEVICE FOR WHEELCHAIRS

(75) Inventor: Ulrich Alber, Albstadt (DE)

(73) Assignee: Alber Antriebstechnik GmbH, Albstadt (DE)

( * ) Notice: Subject to any disclaimer, the term of this patent is extended or adjusted under 35 U.S.C. 154(b) by 0 days.

(21) Appl. No.: 10/323,166

(22) Filed: Dec. 18, 2002

(65) Prior Publication Data

US 2003/0116370 A1 Jun. 26, 2003

(30) Foreign Application Priority Data

Dec. 20, 2001 (DE) ........................................ 201 20 619

(51) Int. Cl.[7] ................................................ B60K 1/00

(52) U.S. Cl. .................. 180/65.5; 180/65.1; 280/250.1; 280/304.1

(58) Field of Search ........................... 280/250.1, 304.1; 180/65.5, 65.1–65.3, 907, 65.8, 65.48, 6.5

(56) References Cited

U.S. PATENT DOCUMENTS

| | | | | |
|---|---|---|---|---|
| 5,261,684 A | | 11/1993 | Soto | |
| 5,669,619 A | * | 9/1997 | Kim, II | 280/250.1 |
| 6,148,942 A | * | 11/2000 | Mackert, Sr. | 180/65.6 |
| 6,494,278 B1 | * | 12/2002 | Weisz | 180/65.5 |

FOREIGN PATENT DOCUMENTS

| | | |
|---|---|---|
| DE | 197 48 877 A1 | 5/1999 |
| GB | 2 043 554 A | 10/1980 |

* cited by examiner

*Primary Examiner*—Lesley D. Morris
*Assistant Examiner*—L. Lum
(74) *Attorney, Agent, or Firm*—Michael J. Striker

(57) ABSTRACT

An operating- and braking-assistance device for wheelchairs is attachable on the frame of a wheelchair. The device has at least one motorized pinion (15), which is driveable in both directions and which engages on an inner gear (14) that is attachable to the rim (11) of a wheel (10) of the wheelchair.

4 Claims, 2 Drawing Sheets

OPERATING-AND BRAKING-ASSISTANCE DEVICE FOR WHEELCHAIRS

BACKGROUND OF THE INVENTION

The present invention relates to an operating- and braking-assistance device for wheelchairs, which is attachable to the frame of a wheelchair. Such assistance devices facilitate the sliding or rolling of a person sitting in a wheelchair on inclined or on rough, difficult-to-maneuver surfaces. With these individual sliding aids, support of the braking process on steep terrain is also possible. Known sliding and brake aids therefore have either a friction wheel that is motorized and able to be pressed down on the surface or a hub drive for the wheels of the wheelchair. The assistance devices with friction wheels have the disadvantage that the friction wheel must lie on the ground with a relatively large downward pressure, in order to be sufficiently operable. Hub drives are expensive to construct and have an unfavorable gear ratio, so that, in practice, a gear drive is required.

The present invention addresses the underlying problem of making a sliding and braking aid for wheelchairs, which has high operational efficiency and power with a minimal expenditure of force, and which is easy to mount and disassemble.

SUMMARY OF THE INVENTION

The above problem is resolved with an operating- and braking-assistance device for wheelchairs, which is attachable to the frame of a wheelchair, and which according to the present invention, has at least one pinion that is motorized to be driveable both directions, which engages on an internal gear on the rim of a wheel of the wheelchair. The pinion engaging on the internal gear makes possible a large mechanical "step-up" also without gears. The device can be easily mounted and dismounted, whereby the internal gear can remain on the wheel.

In order to maintain the most uniform driving and braking conditions, advantageously an internal gear, which is engagable with a pinion, is securable to each wheel. Both pinions can thereby be driven by a common motor shaft.

The internal gear can have an attachment section running about its radially outer side, the attachment section having a hook-shaped cross section and being suspendable on the rim of the wheel. This attachment section, which is preferably elastically deformable, can be easily suspended in the rim, when air is let out of the tire of the wheel. Subsequently, the tire is again pumped up and in this manner, also the attachment section is braced with the rim. The internal gear, then, is therefore very simple to attach later to the wheel of a wheelchair. It can also remain with disassembled sliding and brake devices, since it does not prevent the normal hand operation of the wheelchair via a grip ring or screw.

Based on the favorable transmission ratio, the pinion can be directly driven by the motor shaft. In the event it is desired or necessary, of course, however, also a gear unit and differential can be provided between the motor and pinion.

DETAILED DESCRIPTION OF THE PREFERRED EMBODIMENTS

Figure 1:
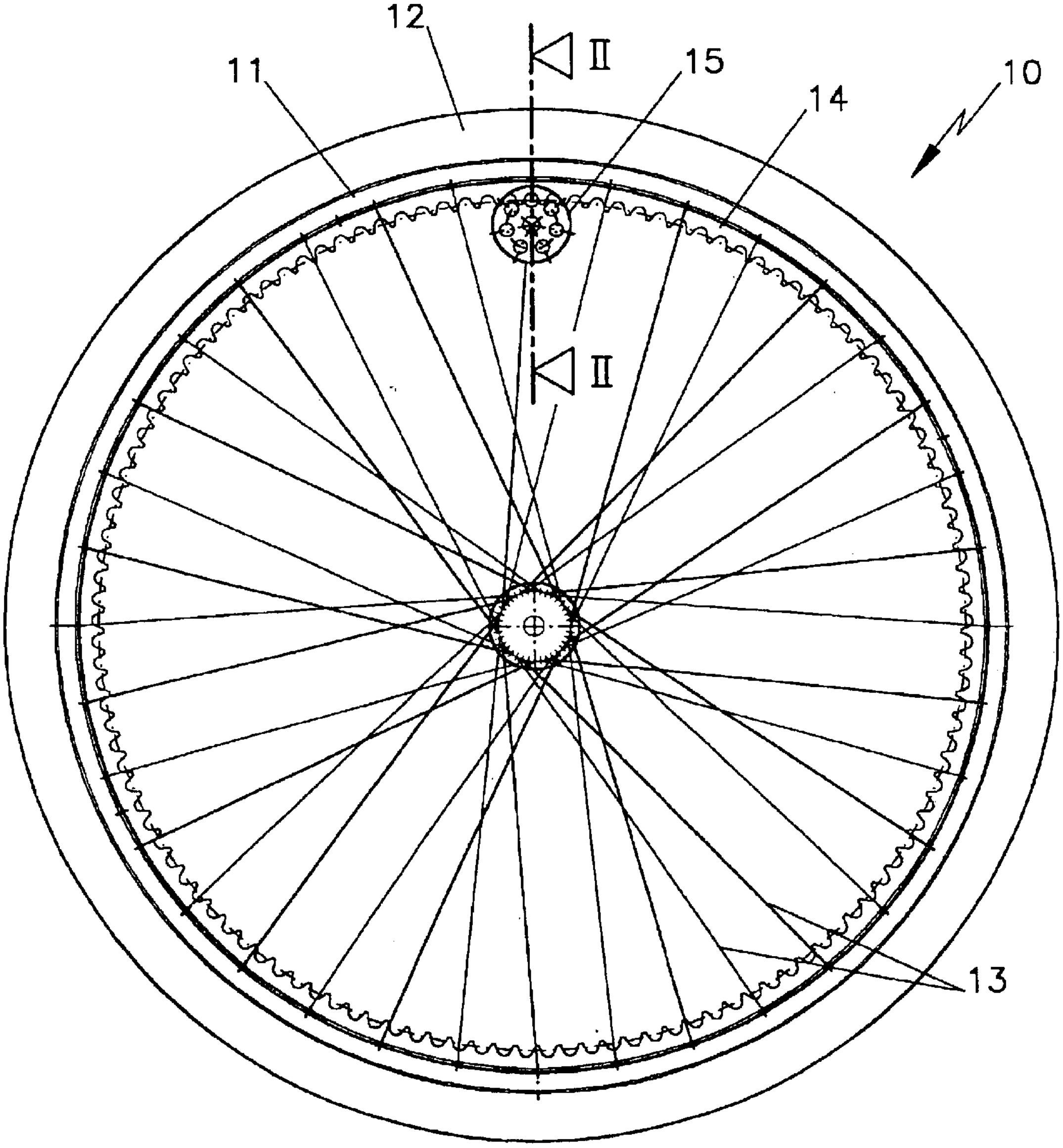
FIG. 1 shows a side view of the wheel of a wheelchair with the operating- and braking-assistance device of the present invention.
Figure 2:
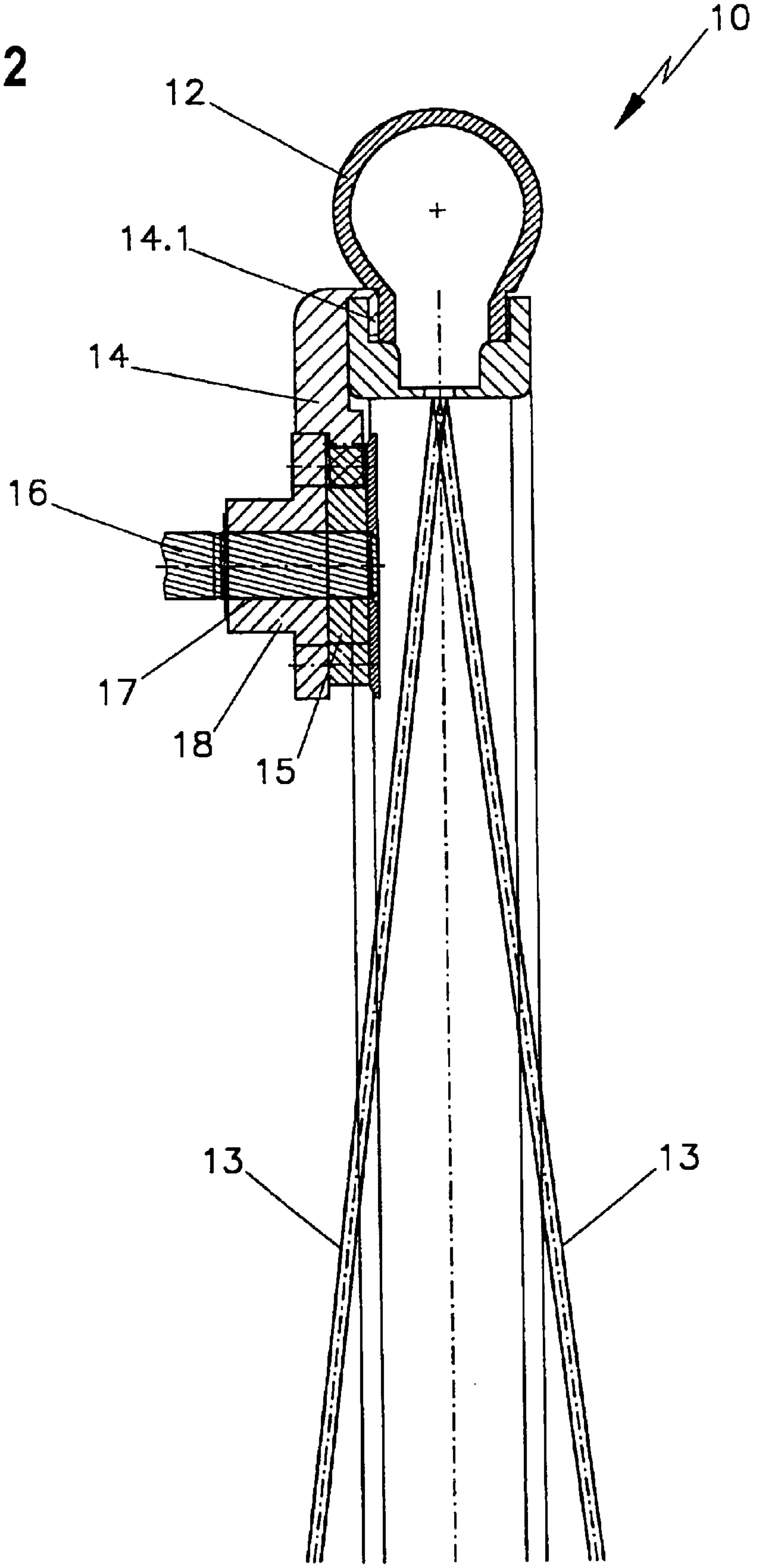
FIG. 2 shows an enlarged sectional illustration along lines II—II through the wheel of FIG. 1.

The wheel 10 of a wheelchair (not illustrated), according to FIG. 1, has a rim 11, an air-filled tire 12, as well as spokes 13. For motorized assistance of a person riding in a wheel chair, a sliding- and braking-assistance device is provided, of which an inner gear 14 as well as a pinion 15 are represented. The inner gear 14 is attached on the rim 11. The pinion 15 is driven by the shaft of a motor (not shown here).

As FIG. 1 shows, the inner gear 14 has an attachment section 14.1 in its radially outward region that is hook-shaped in cross section, which is suspended in the rim 11. At least the attachment section 14.2 of the inner gear 14 comprises an elastically deformable material, so that the attachment section 14.1 is invertable over the rim 11, when the air is let out of the tire 12. If the tire 12 is later refilled with air, the attachment section 14.1 is fixed between the tire 12 and the rim 10. The inner gear 14, therefore, can be attached without a tool on the wheel of a wheelchair. The pinion 15 is driven by a shaft 16, which can directly be the motor shaft. Of course, however, it is also possible to provide a gear unit and differential between the motor and pinion 15. The pinion 15 is able to be driven in both directions, so that assistance in the sliding/rolling action of the wheel chair is provided, as well as assistance in the braking action of the wheel chair with the inventive device. The axial distance for the toothing of the pinion 15 and the inner gear 14 is defined by means of a track-supporting roller, for which a bearing 17 is provided.

It will be understood that each of the elements described above, or two or more together, may also find a useful application in other types of constructions differing from the types described above.

While the invention has been illustrated and described herein an operating and braking assistance device for wheelchairs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. Operating- and braking-assistance device for a wheelchair, which is attached to a frame of the wheelchair, characterized in that the device has at least one motorized pinion (15), said at least one pinion (15) being drivable in two directions, wherein said at least one pinion (15) engages on an inner gear (14) attachable to a rim (11) of a wheel (10) of the wheelchair, the inner gear (14) has an attachment section (14.1) on a radial outer side of said inner gear (14), wherein said attachment section (14.1) has a hooked cross section, and wherein the attachment section (14.1) is suspendable by said hooked cross-section in the rim (11) of the wheel (10), to allow attachment of the inner gear (14) to the rim (11) of the wheel (10) of the existing wheelchair without a tool.

2. Device as defined in claim 1, characterized in that the attachment section (14.1) is elastically deformable.

3. Device as defined in claim 1, characterized in that the at least one pinion (15) is driveable directly by a motor shaft or by means of a gear unit.

4. Operating- and braking-assistance device for a wheelchair, which is attached to a frame of the wheelchair, characterized in that the device has at least one motorized pinion (15), said at least one pinion (15) being drivable in two directions, wherein said at least one pinion (15) engages on an inner gear (14) attachable to a rim (11), of a wheel (10) of the wheelchair, the inner gear (14) has an attachment section (14.1) on a radial outerside of said inner gear(14), wherein said attachment section (14.1) has a hooked cross section, and wherein the attachment section (14.1) is suspendable in the rim (11) of the wheel (10), and the attachment section (14.1) is elastically deformable.

* * * * *